United States Patent
Yang

(10) Patent No.: US 8,562,470 B2
(45) Date of Patent: Oct. 22, 2013

(54) DUAL-DRIVE ELECTRIC MACHINE INSTALLED WITH EPICYCLE GEAR TYPE CLUTCH

(76) Inventor: Tai-Her Yang, Dzan-Hwa (TW)

( * ) Notice: Subject to any disclaimer, the term of this patent is extended or adjusted under 35 U.S.C. 154(b) by 120 days.

(21) Appl. No.: 13/033,866

(22) Filed: Feb. 24, 2011

(65) Prior Publication Data

US 2012/0220413 A1    Aug. 30, 2012

(51) Int. Cl.
*F16H 3/72* (2006.01)
(52) U.S. Cl.
USPC ............................................................ 475/9
(58) Field of Classification Search
USPC .................................................................. 475/9
See application file for complete search history.

(56) References Cited

U.S. PATENT DOCUMENTS

| 4,467,230 | A * | 8/1984 | Rovinsky ........................ 310/83 |
| 7,220,207 | B2 * | 5/2007 | Yamamoto ..................... 475/150 |
| 7,497,286 | B2 * | 3/2009 | Keller et al. .................. 180/65.6 |
| 2003/0015359 | A1 * | 1/2003 | Hanscombe ................. 180/65.6 |
| 2005/0034906 | A1 * | 2/2005 | Liao ............................. 180/65.6 |

* cited by examiner

*Primary Examiner* — Dirk Wright
(74) *Attorney, Agent, or Firm* — Bacon & Thomas, PLLC

(57) ABSTRACT

The present invention is structured by a dual-drive electric machine being combined with an epicycle gear set (EG101) installed in the inner rotation part of electric machine (EM101), and a controllable brake device being installed at an output/input end shaft, through controlling the controllable brake device to perform brake locking or releasing, the operations of transmission function of connecting transmission or releasing between a rotation shaft (S101) at an output/input end, a rotation shaft (S102) at an output/input end and a sleeve type rotation shaft (AS101) at an output/input end of the epicycle gear set (EG101) are enabled to be controlled, thereby to control the interactive operations between the dual-drive electric machine (EM100) and the output/input ends.

19 Claims, 4 Drawing Sheets

DUAL-DRIVE ELECTRIC MACHINE INSTALLED WITH EPICYCLE GEAR TYPE CLUTCH

BACKGROUND OF THE INVENTION (a) Field of the Invention

The present invention is structured by a dual-drive electric machine being combined with an epicycle gear set (EG101) installed in the inner rotation part of electric machine (EM101), and a controllable brake device being installed at an output/input end shaft, through controlling the controllable brake device to perform brake locking or releasing, the operations of transmission function of connecting transmission or releasing between a rotation shaft (S101) at an output/input end, a rotation shaft (S102) at an output/input end and a sleeve type rotation shaft (AS101) at an output/input end of the epicycle gear set (EG101) are enabled to be controlled, thereby to control the interactive operations between the dual-drive electric machine (EM100) and the output/input ends.

(b) Description of the Prior Art

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

SUMMARY OF THE INVENTION

The present invention provides a dual-drive electric machine installed with the epicycle gear type clutch, in which an inner rotation part of electric machine (EM101) of the dual-drive electric machine (EM100) is combined with a rocker arm (A101) and an epicycle wheel (W103) of an epicycle gear set (EG101) installed in the inner rotation part of electric machine (EM101), and a rotation shaft (S101) connected to an input wheel (W101) is served as an output/input end; a rotation shaft (S102) connected to an output wheel (W102) is served as an output/input end; an outer rotation part of electric machine (EM102) is connected to a sleeve type rotation shaft (AS101), and the sleeve type rotation shaft (AS101) is rotated and sleeved on the rotation shaft (S101) for being served as an output/input end; thereby a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the epicycle gear set (EG101) are enabled to be controlled, and the interactive operations between the dual-drive electric machine (EM100) and the output/input ends are also enabled to be controlled.

DESCRIPTION OF MAIN COMPONENT SYMBOLS

A101: Rocker arm
AS101: Sleeve type rotation shaft
BK101, BK102, BK103: Controllable brake device
EG101: Epicycle gear set
EM100: Dual-drive electric machine
EM101 Inner rotation part of electric machine
EM102: Outer rotation part of electric machine
H100: Housing
S101, S102: Rotation shaft
W101: Input wheel
W102: Output wheel
W103: Epicycle wheel

DETAILED DESCRIPTION OF THE PREFERRED EMBODIMENTS

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

The present invention provides a dual-drive electric machine installed with the epicycle gear type clutch, in which an inner rotation part of electric machine (EM101) of the dual-drive electric machine (EM100) is combined with a rocker arm (A101) and an epicycle wheel (W103) of an epicycle gear set (EG101) installed in the inner rotation part of electric machine (EM101), and a rotation shaft (S101) connected to an input wheel (W101) is served as an output/input end; a rotation shaft (S102) connected to an output wheel (W102) is served as an output/input end; an outer rotation part of electric machine (EM102) is connected to a sleeve type rotation shaft (AS101), and the sleeve type rotation shaft (AS101) is rotated and sleeved on the rotation shaft (S101) for being served as an output/input end; thereby a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the epicycle gear set (EG101) are enabled to be controlled, and the interactive operations between the dual-drive electric machine (EM100) and the output/input ends are also enabled to be controlled.

Figure 1:
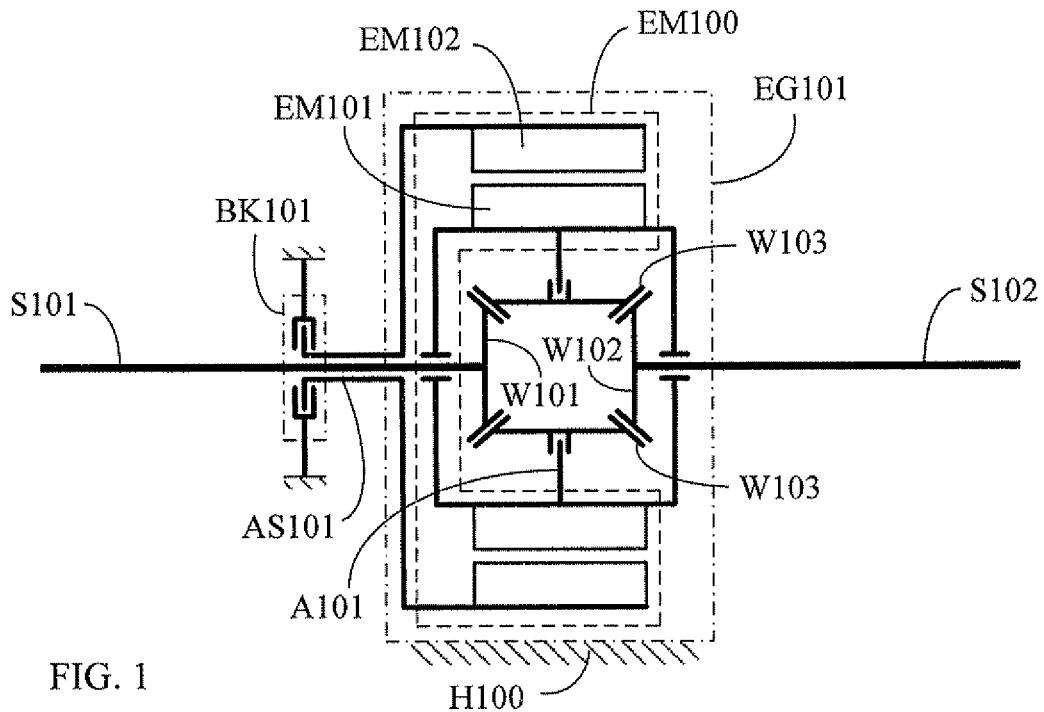
FIG. 1 is a schematic structural view showing the rotation shaft (S101) being combined with the input wheel (W101) of the epicycle gear set (EG101) for being served as an output/input end, the rocker arm (A101) linked by the epicycle wheel (W103) being combined with the inner rotation part of electric machine (EM101), the outer rotation part of electric machine (EM102) being combined with the sleeve type rotation shaft (AS101), the sleeve type rotation shaft (AS101) rotated and sleeved on the rotation shaft (S101) being served as an output/input end and provided for connecting to an action side of the controllable brake device (BK101) while the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end, according to one embodiment of the present invention.

The structures and embodiments of the dual-drive electric machine installed with epicycle gear type clutch are disclosed as followings:

FIG. 1 is a schematic structural view showing the rotation shaft (S101) being combined with the input wheel (W101) of the epicycle gear set (EG101) for being served as an output/input end, the rocker arm (A101) linked by the epicycle wheel (W103) being combined with the inner rotation part of electric machine (EM101), the outer rotation part of electric machine (EM102) being combined with the sleeve type rotation shaft (AS101), the sleeve type rotation shaft (AS101) rotated and sleeved on the rotation shaft (S101) being served as an output/input end and provided for connecting to an action side of the controllable brake device (BK101) while the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end, according to one embodiment of the present invention.

As show in FIG. 1, it mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end, the rocker arm (A101) linked by the epicycle wheel (W103) is combined with the inner rotation part of electric machine (EM101), the outer rotation part of electric machine (EM102) is combined with the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the output wheel (W102) of the epicycle gear set (EG101) is provided for driving the rotation shaft (S102) to be served as an output/input end, and the rotation shaft (S101) combined with the input wheel (W101) is also served as an output/input end;

According to the embodiment shown in FIG. 1, the operations of the dual-drive electric machine installed with epicycle gear type clutch of the present invention include one or more than one of following functions:

When the controllable brake device (BK101) is controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function for performing interactive operations according to the damping of the external load or the externally inputted rotary kinetic energy sustained by the rotation shaft (S101) and the rotation shaft (S102);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 2:
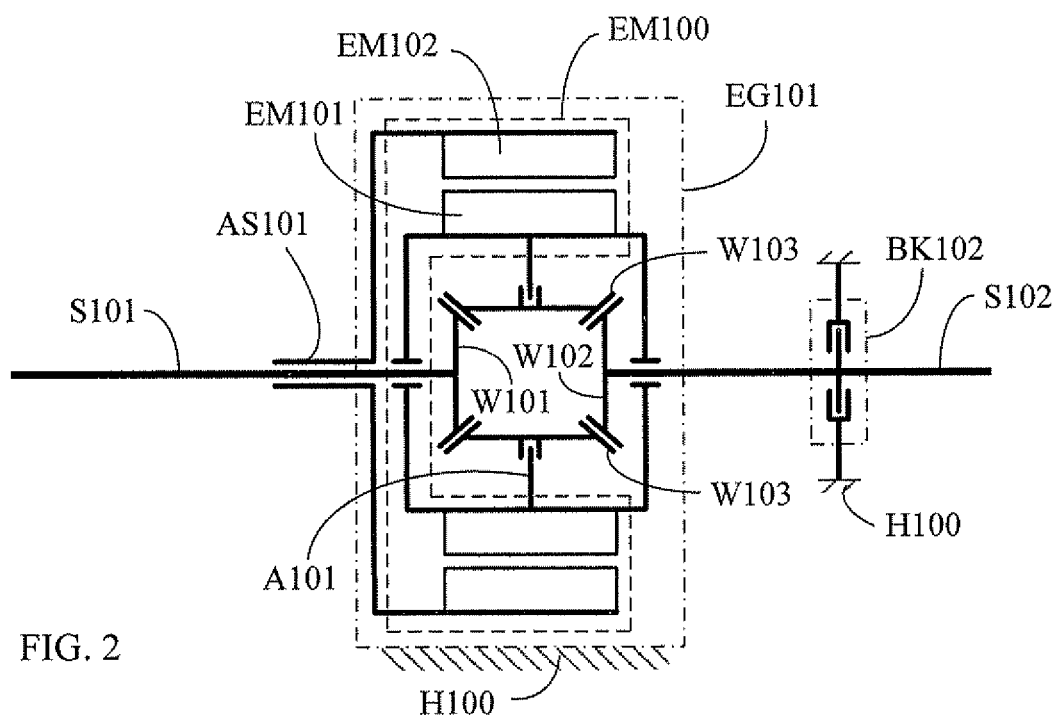
FIG. 2 is a schematic structural view showing the rotation shaft (S101) combined with the input wheel (W101) of the epicycle gear set (EG101) being served as an output/input end, the rocker arm (A101) linked by the epicycle wheel (W103) being combined with the inner rotation part of electric machine (EM101), the outer rotation part of electric machine (EM102) being combined with the sleeve type rotation shaft (AS101), the sleeve type rotation shaft (AS101) rotated and sleeved on the rotation shaft (S101) being served as an output/input end, the output wheel (W102) of the epicycle gear set (EG101) being provided for driving the rotation shaft (S102) to be served as an output/input end, and the rotation shaft (S102) being connected to an action side of the controllable brake device (BK102) while the other action side of the controllable brake device (BK102) being fixed in the housing (H100), according to one embodiment of the present invention.

FIG. 2 is a schematic structural view showing the rotation shaft (S101) combined with the input wheel (W101) of the epicycle gear set (EG101) being served as an output/input end, the rocker arm (A101) linked by the epicycle wheel (W103) being combined with the inner rotation part of electric machine (EM101), the outer rotation part of electric machine (EM102) being combined with the sleeve type rotation shaft (AS101), the sleeve type rotation shaft (AS101) rotated and sleeved on the rotation shaft (S101) being served as an output/input end, the output wheel (W102) of the epicycle gear set (EG101) being provided for driving the rotation shaft (S102) to be served as an output/input end, and the rotation shaft (S102) being connected to an action side of the controllable brake device (BK102) while the other action side of the controllable brake device (BK102) being fixed in the housing (H100), according to one embodiment of the present invention.

As show in FIG. 2, it mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end, the rocker arm (A101) linked by the epicycle wheel (W103) is combined with the inner rotation part of electric machine (EM101), the outer rotation part of electric machine (EM102) is combined with the sleeve type rotation shaft (AS101), and the sleeve type rotation shaft (AS101) rotated and sleeved on the rotation shaft (S101) is served as an output/input end;

The output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 2, the operations of the dual-drive electric machine installed with epicycle gear type clutch of the present invention include one or more than one of following functions:

When the controllable brake device (BK102) is controlled to be in the releasing state, and the dual-drive electric machine (EM100) is not operated as the electric machinery function, the transmission relations between the rotation shaft (S101) and the sleeve type rotation shaft (AS101) and the rotation shaft (S102) are in the releasing state allowing idle rotation;

When the controllable brake device (BK102) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function for performing interactive operations according to the damping of the external load or the externally inputted rotary kinetic energy sustained by the rotation shaft (S101) and the sleeve type rotation shaft (AS101);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 3:
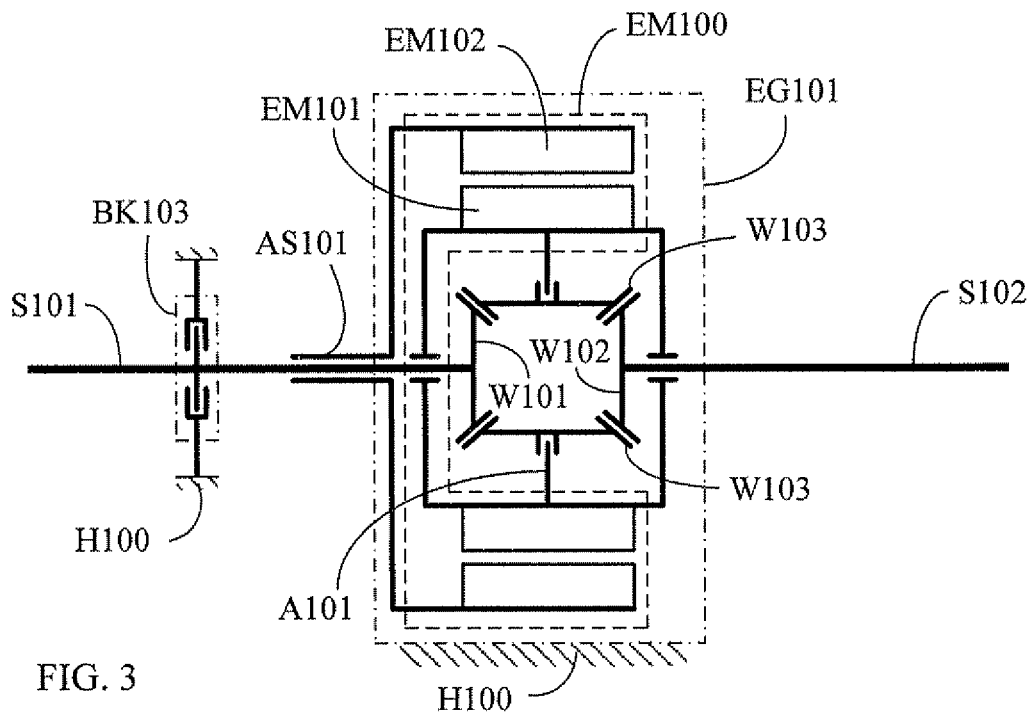
FIG. 3 is a schematic structural view showing the rotation shaft (S101) being combined with the input wheel (W101) of the epicycle gear set (EG101) and provided for connecting to an action side of the controllable brake device (BK103) while the other action side of the controllable brake device (BK103) being fixed in the housing (H100), the epicycle gear set (EG101) also being fixed in the housing (H100), the epicycle wheel (W103) of the epicycle gear set (EG101) being provided for linking the rocker arm (A101) and combined with the inner rotation part of electric machine (EM101), the outer rotation part of electric machine (EM102) being connected to the sleeve type rotation shaft (AS101), the sleeve type rotation shaft (AS101) rotated and sleeved on the rotation shaft (S101) being served as an output/input end, and the output wheel (W102) of the epicycle gear set (EG101) being provided for driving the rotation shaft (S102) to be served as an output/input end, according to one embodiment of the present invention.

FIG. 3 is a schematic structural view showing the rotation shaft (S101) being combined with the input wheel (W101) of the epicycle gear set (EG101) and provided for connecting to an action side of the controllable brake device (BK103) while the other action side of the controllable brake device (BK103) being fixed in the housing (H100), the epicycle gear set (EG101) also being fixed in the housing (H100), the epicycle wheel (W103) of the epicycle gear set (EG101) being provided for linking the rocker arm (A101) and combined with the inner rotation part of electric machine (EM101), the outer rotation part of electric machine (EM102) being connected to the sleeve type rotation shaft (AS101), the sleeve type rotation shaft (AS101) rotated and sleeved on the rotation shaft (S101) being served as an output/input end, and the output wheel (W102) of the epicycle gear set (EG101) being provided for driving the rotation shaft (S102) to be served as an output/input end, according to one embodiment of the present invention.

As show in FIG. 3, it mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100);

The epicycle wheel (W103) of the epicycle gear set (EG101) is provided for linking the rocker arm (A101) and combined with the inner rotation part of electric machine (EM101), the outer rotation part of electric machine (EM102)

is connected to the sleeve type rotation shaft (AS101), the sleeve type rotation shaft (AS101) rotated and sleeved with the rotation shaft (S101) is served as an output/input end, the output wheel (W102) of the epicycle gear set (EG101) is provided for driving the rotation shaft (S102) to be served as an output/input end, and the rotation shaft (S101) combined with the input wheel (W101) is also served as an output/input end;

The operations of the dual-drive electric machine installed with epicycle gear type clutch shown in FIG. 3 include one or more than one of following functions:

When the controllable brake device (BK103) is controlled to be in the releasing state, and the dual-drive electric machine (EM100) is not operated as the electric machinery function, the transmission relation between the rotation shaft (S101) and the sleeve type rotation shaft (AS101) and the rotation shaft (S102) are in the releasing state allowing idle rotation;

When the controllable brake device (BK103) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state, and the dual-drive electric machine (EM100) is operated as the electric machinery function, between the inner rotation part of electric machine (EM101) and the outer rotation part of electric machine (EM102) is operated as the power generator function or the motor function for performing interactive operations according to the damping of the external load or the externally inputted rotary kinetic energy sustained by the sleeve type rotation shaft (AS101) and the rotation shaft (S102);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 4:
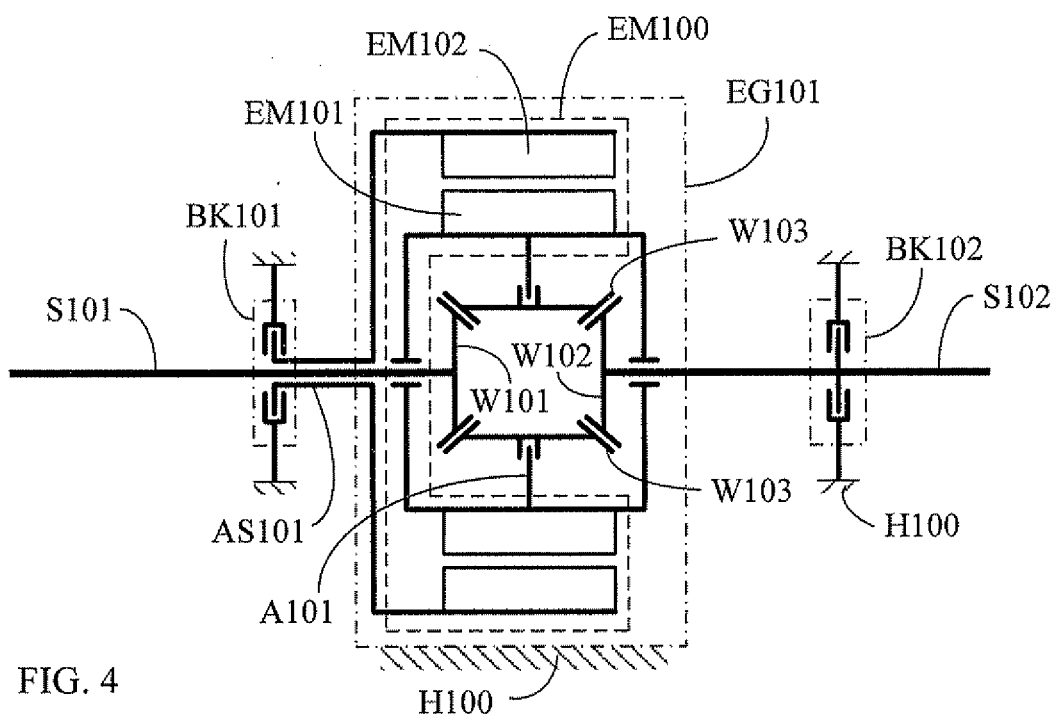
FIG. 4 is a schematic structural view showing the controllable brake device (BK102) being further installed between the rotation shaft (S102) and the housing (H100) as shown in FIG. 1.

FIG. 4 is a schematic structural view showing the controllable brake device (BK102) being further installed between the rotation shaft (S102) and the housing (H100) as shown in FIG. 1.

As shown in FIG. 4, the rotation shaft (S101) combined with the input wheel (W101) of the epicycle gear set (EG101) is served as an output/input end, the rocker arm (A101) linked by the epicycle wheel (W103) is combined with the inner rotation part of electric machine (EM101), the outer rotation part of electric machine (EM102) is combined with the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the epicycle gear set (EG101) is also fixed in the housing (H100), the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected the sleeve type rotation shaft (AS101) or the rocker arm (A101), and the other action side is fixed in the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end, the output wheel (W102) of the epicycle gear set (EG101) combined with the rotation shaft (S102) is served as an output/input end, the rocker arm (A101) linked by the epicycle wheel (W103) is combined with the inner rotation part of electric machine (EM101), the outer rotation part of electric machine (EM102) is combined with the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 4, the operations of the dual-drive electric machine installed with epicycle gear type clutch of the present invention include one or more than one of following functions:

When the controllable brake device (BK101) and the controllable brake device (BK102) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK102) are both controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK102) is controlled to be in the releasing state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK102) is controlled to be in the releasing state, and the dual-drive electric machine (EM100) is operated as the electric machinery function, between the inner rotation part of electric machine (EM101) and the outer rotation part of electric machine (EM102) is operated as the power generator function or the motor function for performing corresponding interactive operations with the damping of the external load or the externally inputted rotary kinetic energy sustained by the rotation shaft (S101) and the rotation shaft (S102);

When the controllable brake device (BK101) is controlled to be in the releasing state and the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK101) and the controllable brake device (BK102) are both controlled to be in the brake locking state, the dual-drive electric machine (EM100) is not operated as an electric machine or as a power generator and the first rotation shaft (S101) is in idle rotation, or the dual-drive electric machine (EM100) is operated as an electric machine to drive the first rotational shaft (S101), or the first rotational shaft (S101) is arranged to drive the dual-drive electric machine (EM100) to operate as a power generator;

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 5:
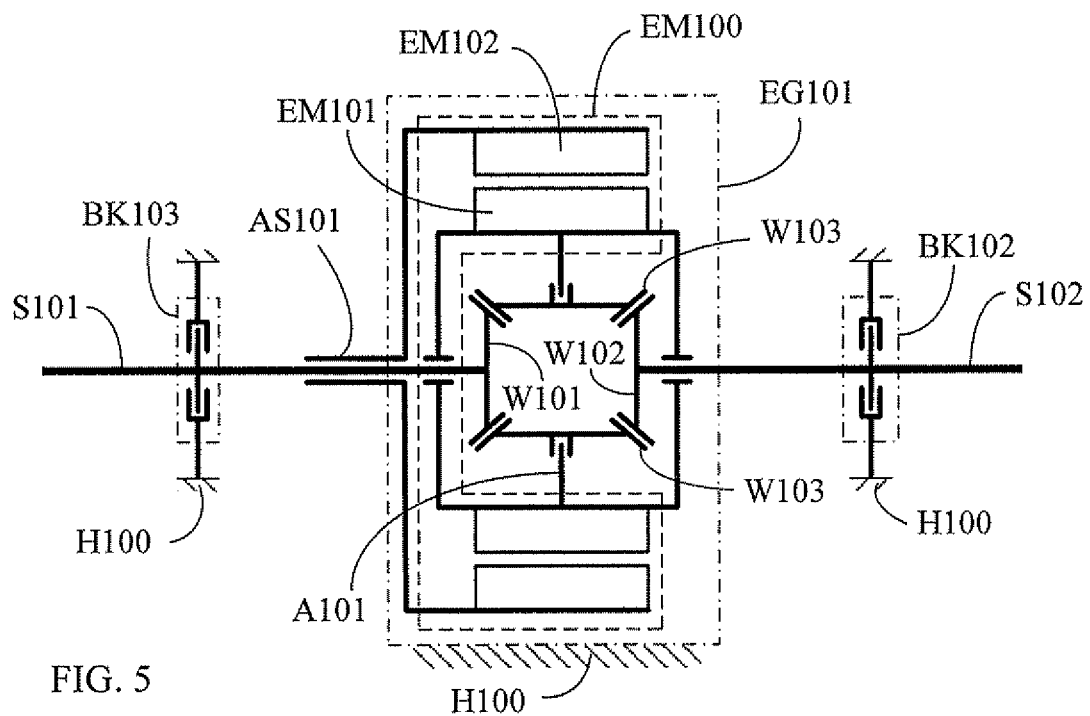
FIG. 5 is a schematic structural view showing the controllable brake device (BK103) being further installed between the rotation shaft (S101) and the housing (H100) as shown in FIG. 2.

FIG. 5 is a schematic structural view showing the controllable brake device (BK103) being further installed between the rotation shaft (S101) and the housing (H100) as shown in FIG. 2.

As shown in FIG. 5, the rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100), the epicycle gear set (EG101) is also fixed in the housing (H100), the epicycle wheel (W103) of the epicycle gear set (EG101) is provided for linking the rocker arm (A101) and combined with the inner rotation part of electric machine (EM101), the outer rotation part of electric machine (EM102) is combined with the sleeve type rotation shaft (AS101), the sleeve type rotation shaft (AS101) rotated and sleeved on the rotation shaft (S101) is served as an output/input end, the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100); the output wheel (W102) of the epicycle gear set (EG101) is combined with the rotation shaft (S102) for being served as an output/input end and provided for connecting to an action side of the controllable brake device (BK102) while the other action side of the controllable brake device (BK102) is fixed in the housing (H100), the rocker arm (A101) linked by the epicycle wheel (W103) is combined with the inner rotation part of electric machine (EM101), the outer rotation part of electric machine (EM102) is combined with the sleeve type rotation shaft (AS101), and the sleeve type rotation shaft (AS101) rotated and sleeved on the rotation shaft (S101) is served as an output/input end;

The operations of the dual-drive electric machine installed with epicycle gear type clutch as shown in FIG. 5 include one or more than one of following functions:

When the controllable brake device (BK102) and the controllable brake device (BK103) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK102) and the controllable brake device (BK103) are both controlled to be in the releasing state, and the dual-drive electric machine (EM100) is operated as the electric machinery function, the corresponding interactive operation of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state and the controllable brake device (BK102) is controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the sleeve type rotation shaft (AS101) and the rotation shaft (S102);

When the controllable brake device (BK103) is controlled to be in the releasing state and the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 6:
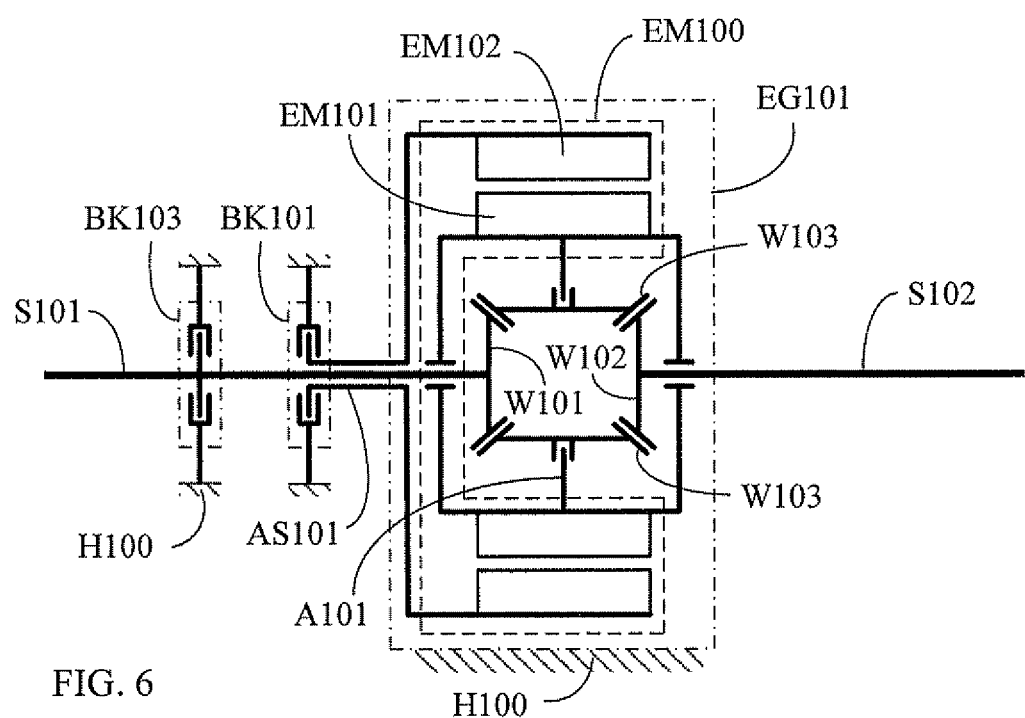
FIG. 6 is a schematic structural view showing the controllable brake device (BK101) being further installed between the sleeve type rotation shaft (AS101) and the housing (H100) as shown in FIG. 3.

FIG. 6 is a schematic structural view showing the controllable brake device (BK101) being further installed between the sleeve type rotation shaft (AS101) and the housing (H100) as shown in FIG. 3.

As shown in FIG. 6, the rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100), the epicycle wheel (W103) of the epicycle gear set (EG101) is provided for linking the rocker arm (A101) and combined with the inner rotation part of electric machine (EM101), the outer rotation part of electric machine (EM102) is connected to the sleeve type rotation shaft (AS101), the sleeve type rotation shaft (AS101) is rotated and sleeved on the rotation shaft (S101) for being served as an output/input end, the sleeve type rotation shaft (AS101) is connected to an action side of the controllable brake device (BK101) while the other action side of the controllable brake device (BK101) is fixed in the housing (H100), the epicycle gear set (EG101) also is fixed in the housing (H100), and the output wheel (W102) of the epicycle gear set (EG101) is provided for driving the rotation shaft (S102) to be served as an output/input end, which mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A 101), and the outer rotation part of electric machine (EM102) is combined with the sleeve type rotation shaft (AS101);

The rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100);

The epicycle wheel (W103) of the epicycle gear set (EG101) is provided for linking the rocker arm (A101) and combined with the inner rotation part of electric machine (EM101), the outer rotation part of electric machine (EM102) is connected to the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), and the output wheel (W102) of the epicycle gear set (EG101) is provided for driving the rotation shaft (S102) to be served as an output/input end;

The operations of the dual-drive electric machine installed with epicycle gear type clutch as shown in FIG. 6 include one or more than one of following functions:

When the controllable brake device (BK101) and the controllable brake device (BK103) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK103) are both controlled to be in the releasing state, and the dual-drive electric machine (EM100) is operated as the electric machinery function, the corresponding interactive operation of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK103) is controlled to be in the releasing state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK103) is controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and rotation shaft (S102);

When the controllable brake device (BK101) is controlled to be in the releasing state and the controllable brake device (BK103) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 7:
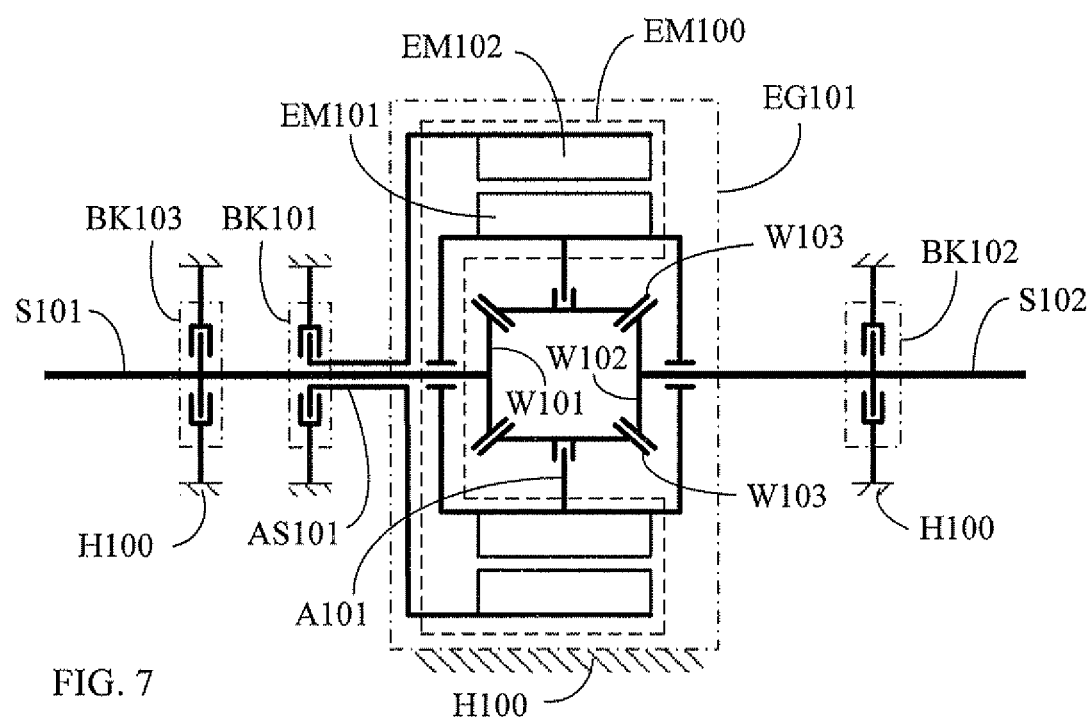
FIG. 7 is a schematic structural view showing the rotation shaft (S101) combined with the input wheel (W101) of the epicycle gear set (EG101) being served as an output/input end and provided for connecting to an action side of the controllable brake device (BK103) while the other action side of the controllable brake device (BK103) being fixed in the housing (H100), the epicycle wheel (W103) of the epicycle gear set (EG101) being provided for linking the rocker arm (A101) and combined with the inner rotation part of electric machine (EM101), the outer rotation part of electric machine (EM102) being connected to the sleeve type rotation shaft (AS101), the sleeve type rotation shaft (AS101) being rotated and sleeved on the rotation shaft (S101) for being served as an output/input end, the sleeve type rotation shaft (AS101) being connected to an action side of the controllable brake device (BK101) while the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end and provided for connecting to an action side of the controllable brake device (BK102) while the other action side of the controllable brake device (BK102) being fixed in the housing (H100), according to one embodiment of the present invention.

FIG. 7 is a schematic structural view showing the rotation shaft (S101) combined with the input wheel (W101) of the epicycle gear set (EG101) being served as an output/input end and provided for connecting to an action side of the controllable brake device (BK103) while the other action side of the controllable brake device (BK103) being fixed in the housing (H100), the epicycle wheel (W103) of the epicycle gear set (EG101) being provided for linking the rocker arm (A101) and combined with the inner rotation part of electric machine (EM101), the outer rotation part of electric machine (EM102) being connected to the sleeve type rotation shaft (AS101), the sleeve type rotation shaft (AS101) being rotated and sleeved on the rotation shaft (S101) for being served as an output/input end, the sleeve type rotation shaft (AS101) being connected to an action side of the controllable brake device (BK101) while the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end and provided for connecting to an action side of the controllable brake device (BK102) while the other action side of the controllable brake device (BK102) being fixed in the housing (H100), according to one embodiment of the present invention.

As shown in FIG. 7, the rotation shaft (S101) combined with the input wheel (W101) of the epicycle gear set (EG101) is served as an output/input end and provided for connecting to an action side of the controllable brake device (BK103) while the other action side of the controllable brake device (BK103) is fixed in the housing (H100), the epicycle wheel (W103) of the epicycle gear set (EG101) is provided for linking the rocker arm (A101) and combined with the inner rotation part of electric machine (EM101), the outer rotation part of electric machine (EM102) is connected to the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the epicycle gear set (EG101) is also fixed in the housing (H100), the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Epicycle gear set (EG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end being combined with the inner rotation part of electric machine (EM101);

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rocker arm (A101), and the outer rotation part of electric machine (EM102) is combined with the sleeve type rotation shaft (AS101);

The rotation shaft (S101) combined with the input wheel (W101) of the epicycle gear set (EG101) is served as an output/input end and provided for connecting to one action side of the controllable brake device (BK103) while an action side of the controllable brake device (BK103) is fixed in the housing (H100);

The epicycle wheel (W103) of the epicycle gear set (EG101) is provided for linking the rocker arm (A101) and combined with the inner rotation part of electric machine (EM101), the outer rotation part of electric machine (EM102) is connected to the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

The operations of the dual-drive electric machine installed with epicycle gear type clutch as shown in FIG. 7 include one or more than one of following functions:

When the controllable brake device (BK101) and the controllable brake device (BK102) and the controllable brake device (BK103) are all controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK102) and the controllable brake device (BK103) are all controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state, the controllable brake device (BK102) and the controllable brake device (BK103) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and rotation shaft (S102);

When the controllable brake device (BK102) is controlled to be in the brake locking state, the controllable brake device (BK101) and the controllable brake device (BK103) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK103) is controlled to be in the brake locking state, the controllable brake device (BK101) and the controllable brake device (BK102) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

The dual-drive electric machine installed with epicycle gear type clutch of the present invention can be applied to various load devices which require mechanical output for driving, such as a ground vehicle, rail vehicle, agriculture machineries or agriculture vehicles, excavator, dozer, construction vehicle, transportation vehicle, garbage truck, hoisting machinery, lifting machinery, forklift machinery, water or underwater boat, aircraft, industrial machineries, tool machine, power device, hand-operated tool, robot or mechanical arm, gardening power tool, domestic electric equipment;

According to the dual-drive electric machine installed with epicycle gear type clutch of the present invention, the sources of externally inputted rotary kinetic energy include an inner combustion engine, an outer combustion engine, a Sterling engine, a steam engine, electric engine, hydraulic engine, pneumatic engine, wind-driven blade device, flow-driven blade device, vapor-driven blade device, human or animal forces.

The invention claimed is:

1. A dual-drive electric machine installed with an epicyclic gear type clutch, comprising:
an electric machine (EM100) having an inner rotation part (EM101) and an outer rotation part (EM102);
a epicyclic gear set (EG101) having an input wheel (W101), an output wheel (W102), and a rocker arm (A101) on which is rotatably mounted at least one epicyclic wheel (W103) rotatably engaged with the input wheel (W101) and the output wheel (W102), said rocker arm (A101) being combined with the inner rotation part (EM101) of the electric machine (EM100);
a first rotation shaft (S101) connected to and rotatable with the input wheel (W101);
a second rotation shaft (S102) connected to and rotatable with the output wheel (W102);
a sleeve type rotation shaft (AS101) rotatably sleeved on the first rotation shaft (S101), said sleeve type rotation shaft (AS101) being combined with the outer rotation part (EM102) of the electric machine (EM100) such that the outer rotation part (EM102) faces and magnetically interacts with the inner rotation part (EM101);
at least one controllable brake device (BK101, BK102, and/or BK103); and
a housing (H100), wherein:
the first rotation shaft (S101) serves as a first output/input end of the dual-drive electric machine,
the second rotation shaft (S102) serves as a second output/input end of the dual-drive electric machine, and the sleeve type rotation shaft (AS101) serves as a third output/input end of the dual-drive electric machine, a first action side of the at least one controllable brake device (BK101, BK102, and/or BK103) is controllable to lock and release at least one of the first, second, and third output/input ends of the dual-drive electric machine to control transmission of rotational energy between the first rotation shaft (S101), the second rotation shaft (S102) and the sleeve type rotation shaft (AS102), and thereby control interactive operations between the dual-drive electric machine (EM100) and the first, second, and third output/input ends, and a second action side of the at least one controllable brake device (BK101, BK102, and/or BK103) is connected to the housing (H100).

2. A dual-drive electric machine installed with an epicyclic gear type clutch as claimed in claim 1, wherein the at least one controllable brake device (BK101, BK102, and/or BK103) is a controllable brake device controlled by at least one of a manual, mechanical, hydraulic, pneumatic, or electromagnetic force.

3. A dual-drive electric machine installed with an epicyclic gear type clutch as claimed in claim 1, wherein the dual-drive electric machine (EM100) is a DC or AC, brush or brushless, synchronous or asynchronous dual-drive electric machine and the inner rotation part (EM101) is coaxial with the outer rotation part (EM102).

4. A dual-drive electric machine installed with an epicyclic gear type clutch as claimed in claim 3, wherein the dual-drive electric machine (EM100) is arranged to receive externally input electric energy to operate as a motor for individually driving a load or for driving the load in common with an external rotary kinetic energy source, and wherein the dual-drive electric machine is arranged to receive the external rotary kinetic energy or inertial kinetic energy of the load for operating the electric machine as a power generator for driving an external electric load or for charging an external electric storing device.

5. A dual-drive electric machine installed with an epicyclic gear type clutch as claimed in claim 1, wherein the input wheel (W101), output wheel (W102), and epicyclic wheel (W103) have one of the following speed ratio relationships:

the input wheel (W101) rotates at a same speed as the output wheel (W102) and at either a same or different speed than the epicyclic wheel (W103), and the input wheel (W101) rotates at a different speed than the output wheel (W102) and at a same or different speed than the epicyclic wheel (W103), and the output wheel (W102) also rotates at a same or different speed than the epicyclic wheel (W103).

6. A dual-drive electric machine installed with an epicyclic gear type clutch as claimed in claim 1, wherein the first action side of a first said at least one controllable brake device (BK101) is fixed to the sleeve type rotation shaft (AS101), which serves as the third output/input end of the dual-drive electric machine, and the second action side of the first controllable brake device (BK101) is fixed to the housing (H100).

7. A dual-drive electric machine installed with an epicyclic gear type clutch as claimed in claim 6, wherein the dual-drive electric machine installed with an epicyclic gear type clutch is arranged to carry out at least one of the following operations:

when the first controllable brake device (BK101) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) is controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101); and when the first controllable brake device (BK101) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the second rotation shaft (S102).

8. A dual-drive electric machine installed with an epicyclic gear type clutch as claimed in claim 1, wherein the sleeve type rotation shaft is rotatably sleeved on the first rotation shaft (S101), the first action side of a second said at least one controllable brake device (BK102) is fixed to the second rotation shaft (S102), which serves as the second output/input end of the dual-drive electric machine and epicyclic gear set assembly, and the second action side of the second controllable brake device (BK102) is fixed to the housing (H100).

9. A dual-drive electric machine installed with an epicyclic gear type clutch as claimed in claim 8, wherein the dual-drive electric machine installed with an epicyclic gear type clutch is arranged to carry out at least one of the following operations:

when the second controllable brake device (BK102) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the second controllable brake device (BK102) is controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101); and when the second controllable brake device (BK102) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the sleeve type rotation shaft (AS101).

10. A dual-drive electric machine installed with an epicyclic gear type clutch as claimed in claim 1, wherein the sleeve type rotation shaft is rotatably sleeved on the first rotation shaft (S101), the first action side of a third said at least one controllable brake device (BK103) is fixed to the first rotation shaft (S101), which serves as the first output/input end of the dual-drive electric machine and epicyclic gear set assembly, and the second action side of the third controllable brake device (BK103) is fixed to the housing (H100).

11. A dual-drive electric machine installed with an epicyclic gear type clutch as claimed in claim 10, wherein the dual-drive electric machine installed with an epicyclic gear type clutch is arranged to carry out at least one of the following operations:

when the third controllable brake device (BK103) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the third controllable brake device (BK103) is controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101); and when the third controllable brake device (BK103) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the sleeve type rotation shaft (AS101) and the second rotation shaft (S102).

12. A dual-drive electric machine installed with an epicyclic gear type clutch as claimed in claim 1, wherein the sleeve type rotation shaft is rotatably sleeved on the first rotation shaft (S101), the first action side of a first said at least one controllable brake device (BK101) is fixed to the sleeve type rotation shaft (AS101), which serves as the third output/input end of the dual-drive electric machine and epicyclic gear set assembly, the first action side of a second said at least one controllable brake device (BK102) is fixed to the second rotation shaft (S102), which serves as the second output/input end of the dual-drive electric machine and epicyclic gear set assembly, and the second action side of each of the first controllable brake device (BK101) and the second controllable brake device (BK102) is fixed to the housing (H100).

13. A dual-drive electric machine installed with an epicyclic gear type clutch as claimed in claim 12, wherein the dual-drive electric machine installed with an epicyclic gear type clutch is arranged to carry out at least one of the following operations:

when the first controllable brake device (BK101) and the second controllable brake device (BK102) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the second controllable brake device (BK102) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) is controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the second rotation shaft (S102);

when the first controllable brake device (BK101) is controlled to be in the releasing state, the second controllable brake device (BK102) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the sleeve type rotation shaft (AS101); and when the first controllable brake device (BK101) and the second controllable brake device (BK102) are both in the brake locking state, the dual-drive electric machine (EM100) is neither operated as an electric machine nor as a power generator and the first rotation shaft (S101) is in idle rotation, the dual-drive electric machine (EM100) is operated as an electric machine to drive the first rotational shaft (S101), or the first rotational shaft (S101) is arranged to drive the dual-drive electric machine (EM100) to provide a power generator function.

14. A dual-drive electric machine installed with an epicyclic gear type clutch as claimed in claim 1, wherein the sleeve type rotation shaft is rotatably sleeved on the first rotation shaft (S101), the first action side of a second said at least one controllable brake device (BK102) is fixed to the second rotation shaft (S102), which serves as the second output/input end of the dual-drive electric machine and epicyclic gear set assembly, the first action side of a third said at least one controllable brake device (BK103) is fixed to the first rotation shaft (S101), which serves as the first output/input end of the dual-drive electric machine and epicyclic gear set assembly, and the second action side of each of the second controllable brake device (BK102) and the third controllable brake device (BK103) is fixed to the housing (H100).

15. A dual-drive electric machine installed with an epicyclic gear type clutch as claimed in claim 14, wherein the dual-drive electric machine installed with an epicyclic gear type clutch is arranged to carry out at least one of the following operations:

when the second controllable brake device (BK102) and the third controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the second controllable brake device (BK102) and the third controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101);

when the second controllable brake device (BK102) is controlled to be in the brake locking state, the third controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the sleeve type rotation shaft (AS101) and the first rotation shaft (S101); and when the second controllable brake device (BK102) is controlled to be in the releasing state, the third controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the second rotation shaft (S102) and the sleeve type rotation shaft (AS101).

16. A dual-drive electric machine installed with an epicyclic gear type clutch as claimed in claim 1, wherein the sleeve type rotation shaft is rotatably sleeved on the first rotation shaft (S101), the first action side of a first said at least one controllable brake device (BK101) is fixed to the sleeve type rotation shaft (AS101), which serves as the third output/input end of the dual-drive electric machine and epicyclic gear set assembly, the first action side of a third said at least one controllable brake device (BK103) is fixed to the first rotation shaft (S101), which serves as the first output/input end of the dual-drive electric machine and epicyclic gear set assembly, and the second action side of each of the first controllable brake device (BK101) and the third controllable brake device (BK103) is fixed to the housing (H100).

17. A dual-drive electric machine installed with an epicyclic gear type clutch as claimed in claim 15, wherein the dual-drive electric machine installed with an epicyclic gear type clutch is arranged to carry out at least one of the following operations:

when the first controllable brake device (BK101) and the third controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the third controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101);

when the first controllable brake device (BK101) is controlled to be in the brake locking state, the third controllable brake device (BK103) is controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the third controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the second rotation shaft (S102); and when the first controllable brake device (BK101) is controlled to be in the releasing state, the third controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the second rotation shaft (S102) and the sleeve type rotation shaft (AS101).

18. A dual-drive electric machine installed with an epicyclic gear type clutch as claimed in claim 1, wherein the sleeve type rotation shaft is rotatably sleeved on the first rotation shaft (S101), the first action side of a first said at least one controllable brake device (BK101) is fixed to the sleeve type rotation shaft (AS101), which serves as the third output/input end of the dual-drive electric machine and epicyclic gear set assembly, the first action side of a second said at least one controllable brake device (BK102) is fixed to the second rotation shaft (S102), which serves as the second output/input end of the dual-drive electric machine and epicyclic gear set assembly, the first action side of a third said controllable brake device (BK103) is fixed to the first rotation shaft (S101), which serves as a first output/input end of the dual-drive electric machine and epicyclic gear set assembly, and the second action side of each of the first controllable brake device (BK101) and the second controllable brake device (BK102) and the third said controllable brake device (BK103) is fixed to the housing (H100).

19. A dual-drive electric machine installed with an epicyclic gear type clutch as claimed in claim 18, wherein the dual-drive electric machine installed with an epicyclic gear type clutch is arranged to carry out at least one of the following operations:

when the first controllable brake device (BK101), the second controllable brake device (BK102), and the third controllable brake device (BK103) are all controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101), and the second controllable brake device (BK102), and the third controllable brake device (BK103) are all controlled to be in the releasing state and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the second rotation shaft (S102);

when the second controllable brake device (BK102) is controlled to be in the brake locking state, the first controllable brake device (BK101) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the first rotation shaft (S101) and the sleeve type rotation shaft (AS101); and when the third controllable brake device (BK103) is controlled to be in the brake locking state, the first controllable brake device (BK101) and the second controllable brake device (BK102) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotation torque, speed, or direction applied to at least one of the second rotation shaft (S102) and the sleeve type rotation shaft (AS101).

* * * * *